United States Patent [19]

Casteel

[11] 4,199,053
[45] Apr. 22, 1980

[54] CONVEYOR AND TRAY FOR LUGGAGE

[76] Inventor: Joseph M. Casteel, 255 Lytton Rd., Coraopolis, Pa. 15108

[21] Appl. No.: 966,662

[22] Filed: Dec. 5, 1978

Related U.S. Application Data

[63] Continuation of Ser. No. 755,358, Dec. 29, 1976, abandoned.

[51] Int. Cl.$^2$ ............................................. B65G 47/00
[52] U.S. Cl. .................... 198/523; 186/1 A; 198/836; 198/860
[58] Field of Search .............. 198/523, 539, 560, 561, 198/860, 861, 324, 497, 498, 499, 836, 813, 325; 104/25; 186/1 AE, 1 AA, 1 AR, 1 AW, 1 AN, 1 M

[56] References Cited

U.S. PATENT DOCUMENTS

| | | | |
|---|---|---|---|
| 1,956,154 | 4/1934 | Lindquist et al. | 198/325 |
| 2,536,961 | 1/1951 | Smith | 186/1 A |
| 3,458,025 | 7/1969 | Earle | 198/325 |

*Primary Examiner*—Robert B. Reeves
*Assistant Examiner*—Douglas D. Watts
*Attorney, Agent, or Firm*—Robert D. Yeager

[57] ABSTRACT

Side covers which do not utilize any exposed fasteners are provided around the edges of the movable conveyor belt and the associated tray. A high molecular weight polyethylene transition piece is provided between the tray and the movable conveyor for facilitating movement of items from the flat moving carrying surface into the accumulation tray. The covers include an inward extending portion which overlap the ends of the movable conveyor belt. Elongated wood guides are provided for the edges of the conveyor belt along the length of the top flat horizontal moving surface to eliminate tracking problems and belt damage. No portion of the conveyor belt or the associated drive is lower than the side covers. The frame is supported from the floor by rigid tubular steel legs which provide a strong stable structure and allow access to the bottom of the conveyor and the floor. Wooden blocks are provided at the bottom of the tubular legs for support from the floor. The side covers slidably engage the conveyor frame and are connected together as a unit by fasteners which are provided beneath the conveyor and not exposed. All the mechanical drive components and the accumulation tray are enclosed in the volume defined by the side covers. The conveyor belt is formed with a top wear resistant nylon with a low friction surface which permits articles to accumulate on it without scuffing or developing damaging pressure. The take-up and drive for the conveyor belt are located beneath the top horizontal carrying surface which is fixed in length.

27 Claims, 15 Drawing Figures

CONVEYOR AND TRAY FOR LUGGAGE

This is a continuation, of application Ser. No. 755,358, filed Dec. 29, 1976 now abandoned.

BACKGROUND OF THE INVENTION

1. Field of the Invention

This invention relates to conveyors and more particularly to a transfer conveyor adaptable for handling a wide variety of items and including an integral accumulation tray.

2. Description of the Prior Art

At the present time passengers for commercial air travel must go through an inspection procedure wherein all carry-on items are inspected. This inspection can be manual but is very commonly conducted through the use of x-ray or other radiation detecting units. The items which can be carried on the airplane vary widely in size, shape and weight. The items can vary from very thin plastic garment covers to rather heavy items of luggage. It is desirable to have a unit which rapidly and efficiently moves all types of items away from the bottleneck created at the inspection area to a pick-up area. The applicant is unaware of any prior art transfer devices which have proven entirely satisfactory for handling the wide variety of carry-on luggage. One type of transfer device which is sometimes used is an inclined ramp formed from a section of roller conveyor. This type of device has trouble in handling light weight items and small items. The applicant is also aware of various types of counter type conveyors used in supermarkets, these however handle a fairly selected range of items and are under the direct control of a checkout cashier. If a problem such as jamming does occur, the operator can immediately stop the conveyor.

It is desirable to have a transfer system which can rapidly and efficiently move all varieties of carry-on luggage away from an inspection point.

SUMMARY OF THE INVENTION

A luggage transfer conveyor including a continuously moving belt and an integral accumulation tray is provided which rapidly and efficiently moves a wide variety of luggage. The disclosed conveyor which will normally be used where it is visible and accessible to the public is reliable, safe and provides a neat appearance. The continuous conveyor belt provides a smooth horizontal top riding surface to move airplane carry-on luggage to a point away from the congested bottleneck security check. The luggage is automatically transferred to an integral accumulation tray for pick-up. Side covers are provided around the edges of the conveyor belt and the accumulation tray providing a smooth, fastener free, external area. The continuous conveyor belt, the belt drive, the side covers and the tray are supported from an elongated structural frame, which is completely disposed within the area defined by the side covers. Strong legs, formed of structural material, are rigidly connected to the frame, supporting it spaced above the floor. This permits easy access to the floor. The only part of the transfer conveyor extending below the side covers are the supporting leg members. Wooden guides extend along the length of the horizontal top surface to guide the belt and virtually eliminate tracking problems and belt damage. The side covers extend over the edges of the belt and cover the wooden guides. The conveyor belt has a tough top wear resistant nylon cover which will not mark or damage luggage. The conveyor belt has a low friction top surface which lets articles accumulate on it without scuffing or developing damaging pressure. All mechanical components, including the belt edges and pulleys are enclosed. The end pulleys, between which the conveyor belt extends to define the top horizontal surface, are fixed in place when the conveyor is assembled. The belt take-up and drive pulleys are located beneath the flat horizontal top surface. The tray extends at an angle with respect to the top horizontal surface away from one of the end pulleys. A transition piece extends between an edge of the tray and he conveyor belt as it moves around one of the end pulleys. The transition piece engages the belt above the longitudinal axis of the associated end pulley.

The tray and conveyor belt, including all of the associated mechanical drive items, are supported from the frame within the volume defined by the side covers. The side covers, which include horizontal top and vertical side exposed portions, also includes an inwardly extending unexposed bottom portion. When installed, the side covers slidably engage the conveyor belt supporting frame. The side covers are formed from more than one piece, but each has the same cross-sectional area. When the side covers are joined together in a butting relationship, the utilized fastening device is secured to the side covers on the bottom unexposed inwardly projecting surface. The covers are then pulled securely together providing only a thin seam with no exposed fasteners. By thus joining the side covers they act as structural members and add rigidity and support to the floor supported transfer conveyor. This construction permits relatively long spans to be covered with only two sets of support legs.

Preferably the supporting legs support the rest of the transfer conveyor above the floor at a great enough height so that access to the floor beneath the conveyor is easy. This is desirable for permitting cleaning equipment to have easy access to the floor beneath the conveyor. Wooden blocks are provided at the ends of the structural support legs for contacting the floor. These wooden blocks can be trimmed and thus permit some adjustability in the height of the horizontal top surface above the floor and also provide for easy leveling. The wooden blocks provide a neat looking appearance and provide good contact with the floor.

In one embodiment of the invention the side covers are connected together to define a top horizontal U-shaped surface with the tray in proximity to the bight portion of the U and the continuous conveyor disposed between the legs of the U-shaped top surface; extending between the tray and the open end. The open end, or input end, of the transfer conveyor is positioned in proximity to apparatus, such as x-ray inspection equipment, to receive all manner of luggage as it passes through the inspection equipment. The luggage is then transferred to the integral accumulation tray. The tray includes an edge which when assembled is near the conveyor belt as it travels around an end pulley.

A transition piece, formed from a high molecular weight polyethylene, is disposed between the edge of the tray and the conveyor belt. The transition piece has a slotted base portion, which engages the edge of the tray, and a flexible portion, extending from the slotted base portion, which engages the conveyor belt as it travels around the end pulley. The flexible end portion of the transition piece engages the conveyor belt above the horizontal axis of the end pulley. This small polyethylene transition piece forms an important aspect of the present invention and is one of the keys to permitting a wide variety of items to be conveyed and transferred to the accumulation tray.

A transition piece having two flexible portions is also disclosed. This double ended piece is useful between two abutting conveyors.

It is an object of this invention to teach a transfer conveyor, having no exposed external fasteners, for moving a wide variety of items along a continuously moving conveyor belt to an integral accumulation tray.

It is an object of this invention to teach a security transfer conveyor having a continuous moving conveyor belt and an integral accumulation tray surrounded by side covers with only supporting legs extending beneath the side covers.

It is an object of this invention to teach a conveyor, supported above a floor by structural support legs, provided with side covers which are joined together as a unit and provide structural support for the conveyor belt, the associated frame, and the mechanical drive.

BRIEF DESCRIPTION OF THE DRAWINGS

For a better understanding of the invention reference may be had to the preferred embodiments exemplary of the invention shown in the accompanying drawings in which.

DESCRIPTION OF THE PREFERRED EMBODIMENTS

Figure 1:
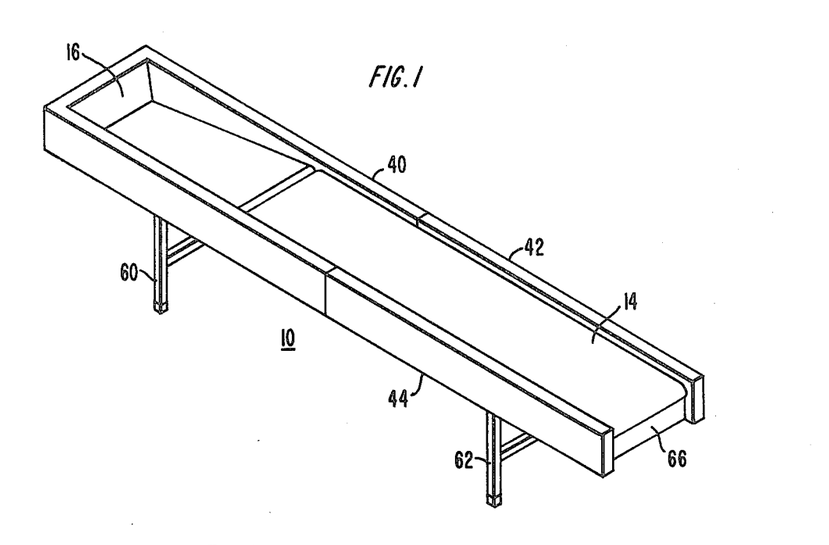
FIG. 1 is an isometric view of a transfer conveyor constructed according to the teaching of the present invention.
Figure 2:
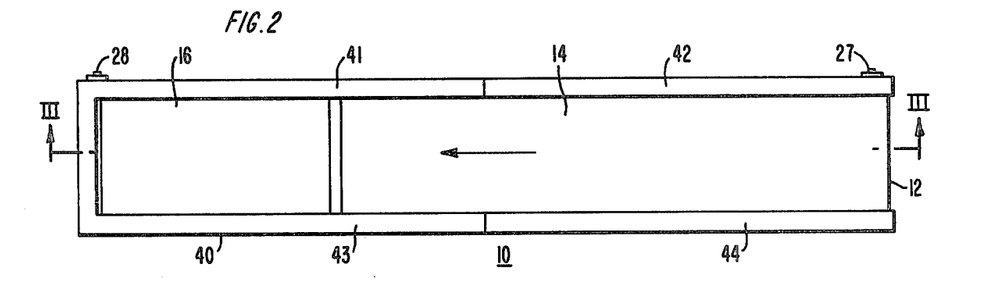
FIG. 2 is a top view of the transfer conveyor shown in FIG. 1.
Figure 3:
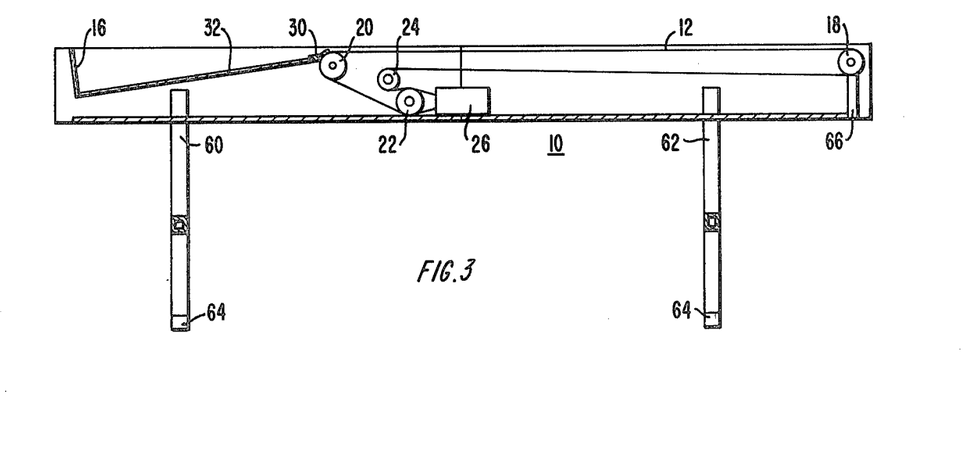
FIG. 3 is a view of the transfer conveyor shown in FIG. 2 along the line III—III.

Referring now to the drawings and FIGS. 1 through 3 in particular there is shown a luggage transfer conveyor 10 constructed in accordance with the teaching of the present invention. Transfer conveyor 10 utilizes a continuously movable conveyor belt 12 which provides a flat horizontal top movable surface 14. Surface 14 is continuously movable towards an integrally formed accumulation tray 16. Continuously movable top surface 14 extends between intake and pulley 18 and discharge end pulley 20. Drive pulley 22 and take-up pulley 24 are located beneath the horizontal top surface 14 of conveyor belt 12. Drive motor 26 is provided for driving drive pulley 22 through a suitable mechanical connection such as a belt or chain drive.

When conveyor 10 is assembled, end pulleys 18 and 20 are fixed in position and slack in conveyor belt 12 is taken up by adjustable take-up pulley 24. FIG. 3 shows the location of various items used to form conveyor 10, however, the structural frame work is omitted for clarity. Top movable surface 14 moves towards integral tray 16 at the rate around 50 to 80 feet per minute. The speed of movable top surface 14 is determined by the size and speed of drive pulley 22. An appropriate speed can be obtained by selecting the desired output speed of gearhead motor 26 and proper sizing of the drive connection to drive pulley 22.

A transition piece 30 is provided between movable surface 14 and tray 16. Integral tray 16 includes a slanted surface 32 which extends downward and at an angle with respect to the top horizontal surface 14. Transition piece 30 is slotted to fit on the free edge of the slanted portion 32 of tray 16. Transition piece 30 which will be described in more detail hereinafter includes a flexible portion which engages conveyor belt 12 as it travels around discharge end pulley 20. A pair of start and stop buttons 27 and 28 are provided at either end of conveyor 10. Start and stop buttons located at positions 27 and 28 control the application of electric power to drive motor 26.

Tray 16 is formed integral with the U-shaped cover 40 which extends around the sides and the end of tray 16. Tray 16 is secured to U-shape side cover 40 by suitable means such as welding. Cover 40 extends past the free edge of tray 16 to which transition piece 30 is attached. Cover 40 has a cross-section which is compatible with the supporting frame 50, shown in detail in FIG. 5, to slidably engage frame 50. During assembly, side cover 40 with the associated tray 16 secured thereto is slid onto one end of frame 50. Side covers 42 and 44, which have the same cross-sectional configuration as the side portions 41, 43 of cover 40, are slid onto the other end of supporting frame 50. Side covers 42 and 44 come into butting engagement with the side portions 41 and 43 respectively on cover 40.

Conveyor 10 is supported from the floor by legs 60 and 62. Legs 60 and 62 are rigidly secured to frame 50 to provide a strong stable support. Wooden blocks 64 are fit onto the free ends of tubular support legs 60 and 62. When the transfer conveyor 10 is installed in service, wooden blocks 64 can be cut or trimmed to allow a small adjustment in the height of moving surface 14. Wooden blocks 64 can also be trimmed to level transfer conveyor 10. It has been found that this arrangement is superior to other types of adjustment, such as a foot screw, for providing strong rigid support. The disclosed conveyor when installed is often subjected to bumping and jarring by passengers receiving or moving their luggage. Adjustable legs if used in this environment tend to become loose and wobbly. For this reason, legs 60 and 62 are securely fastened to frame 50 and are not provided to be adjusted after installation. Side covers 42, 44 are securely connected in a butting relationship with side cover portions 41, 43 respectively. When side covers 42 and 44 are connected to cover 40, they provide additional support for making frame 50 rigid. This permits conveyor 10 to cover a relatively long span with only two pair of supporting legs 60 and 62.

Figures 4, 5:
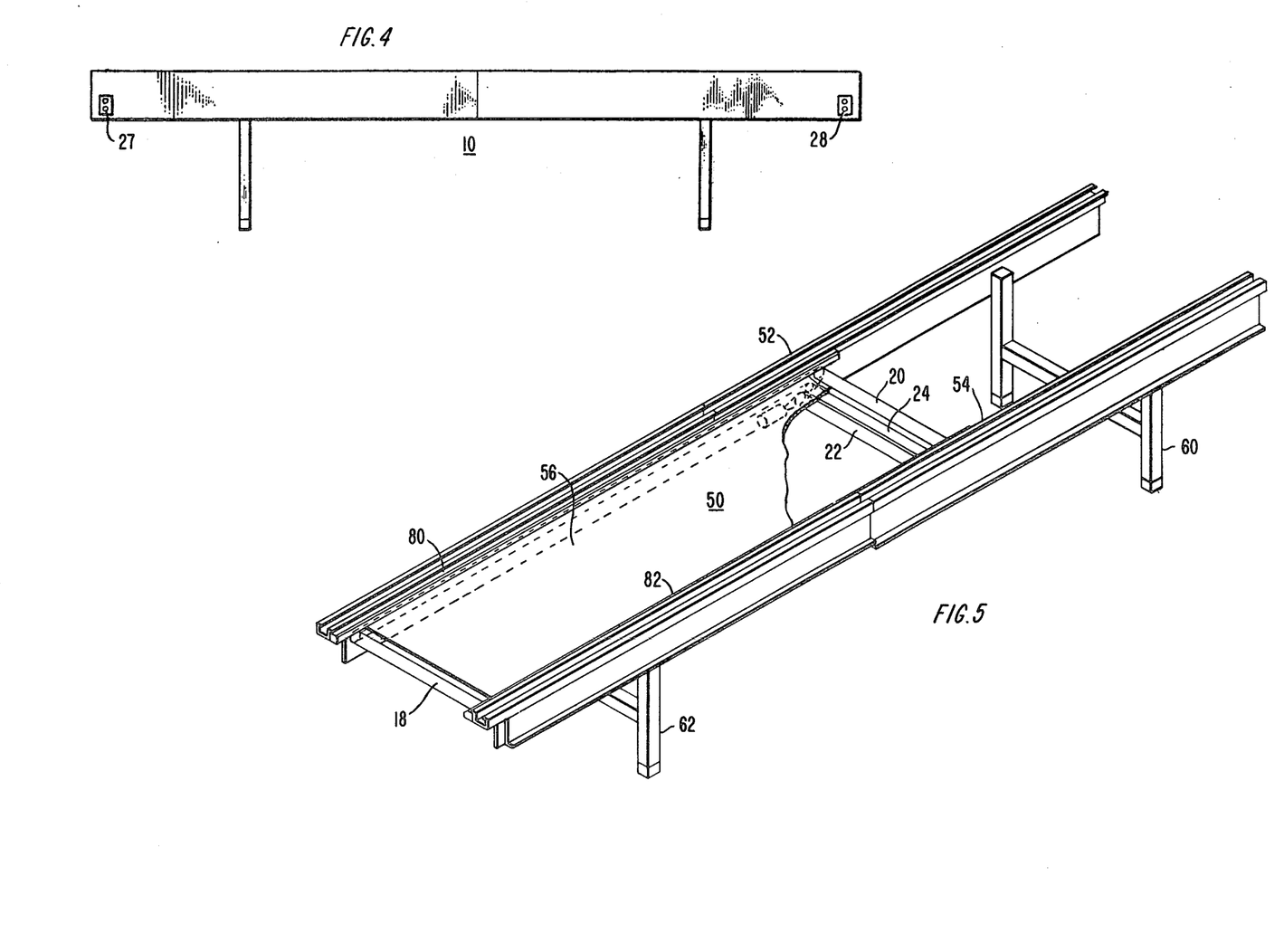
FIG. 4 is a side view of the transfer conveyor shown in FIG. 1.
FIG. 5 is an isometric view of a transfer conveyor according to the teaching of the present invention with the side covers, tray, and conveyor belt removed and having some portions broken away for clarity.

In a typical installation transfer conveyor 10 is positioned at the discharge of a security x-ray unit. Carry-on luggage passes through the x-ray unit onto the conveyor belt 12 and is moved through to accumulation tray 16. The disclosed conveyor 10 moves, without damage, all types of carry-on luggage regardless of size and shape. Conveyor 10 provides a smooth horizontal carrying surface 14 to a point away from the congested bottleneck area, while automatically transferring luggage to the integral fixed accumulation tray 16. The disclosed conveyor 10 provides a lean slim design with only a small seam where side covers 42 and 44 engage cover 40. There are no external or exposed fasteners which can come lose or snag passengers' clothing. Other than the supporting legs, all portions of conveyor 10 are within the volume defined by covers 41 through 44. The covers 40, 42, 44 are preferably formed from a brush finished 14 gauge stainless steel. This provides a unit which can endure long service without damage or deterioration. Belt 12 is formed with a top wear resistant nylon covering which will not mark or damage luggage. The nylon surface of belt 12 has a low coefficient of friction so that articles can accumulate on it without scuffing or developing damaging pressure. As can be seen in FIGS. 3 or 4 none of the mechanical components for supporting or driving conveyor belt 12 extend beneath the side covers 40 through 44. The tubular legs 60 and 62 are formed from a brush crome finished steel and provide a very strong stable structure which allows access to the bottom of the conveyor unit and the floor below. Cleaning equipment can easily pass under the conveyor 10. The transfer conveyor 10 as constructed has a long life expectancy and requires minimum maintenance.

Referring now to FIG. 5 there is shown the frame work 50 to conveyor 10. Legs 60 and 62 are securely fastened to framework 50 by suitable means such as welding or bolting. Frame 52 includes two elongated side portions 52 and 54 which hve a shape complimentary with the shape of the side cover portions 40 through 44. The side cover portions 40 through 44 are constructed so they can slidably engage the elongated side portions 52 and 54 of frame 50. A steel plate member 56 engages longitudinal frame portions 52 and 54 between pulleys 18 and 24. Plate member 56 provides support for the top horizontal surface 14 as conveyor belt 12 moves between pulleys 18 and 20. As conveyor belt 12 moves it rides along member 56 between pulleys 18 and 20. Member 56 provides support for conveyor belt 12 so that surface 14 is flat and can carry relatively heavy loads.

Figures 6, 7, 9:
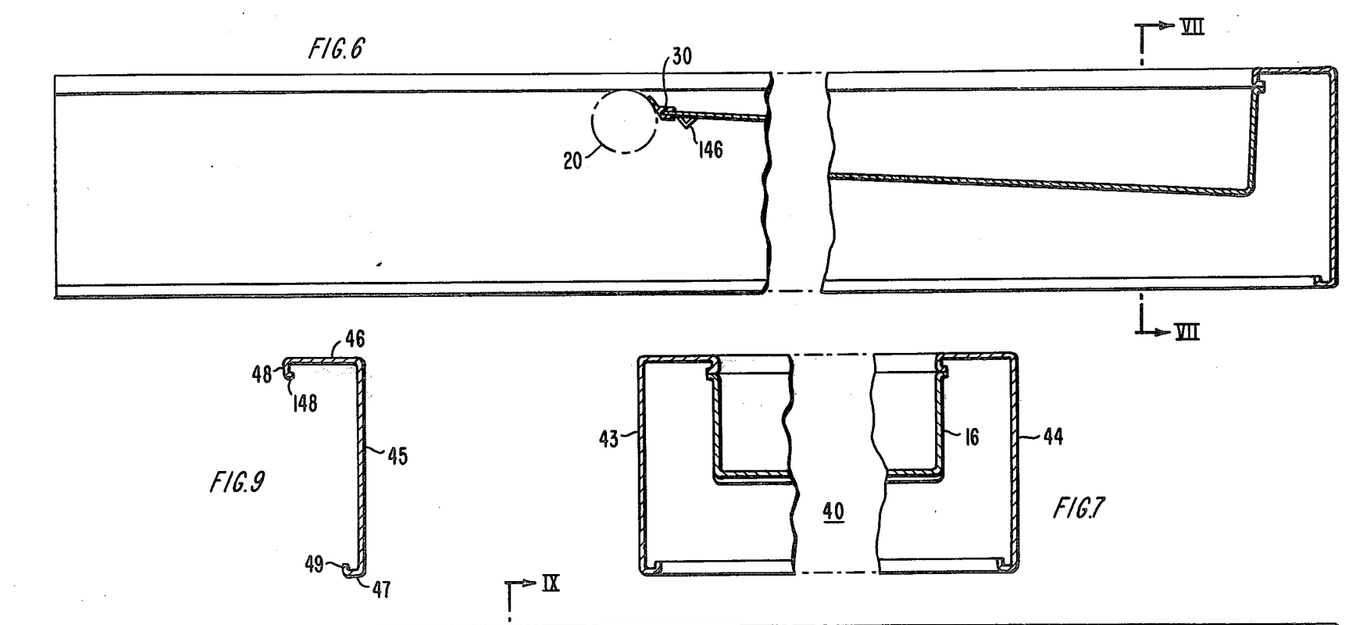
FIG. 6 is a section view through the tray and a portion of the integrally connected cover.
FIG. 7 is a section view of the tray and covers FIG. 6 along the lines VII—VII.
FIG. 9 is a view of the side cover shown in FIG. 8 along the lines IX—IX.
Figures 10, 11, 12, 13, 14, 15:
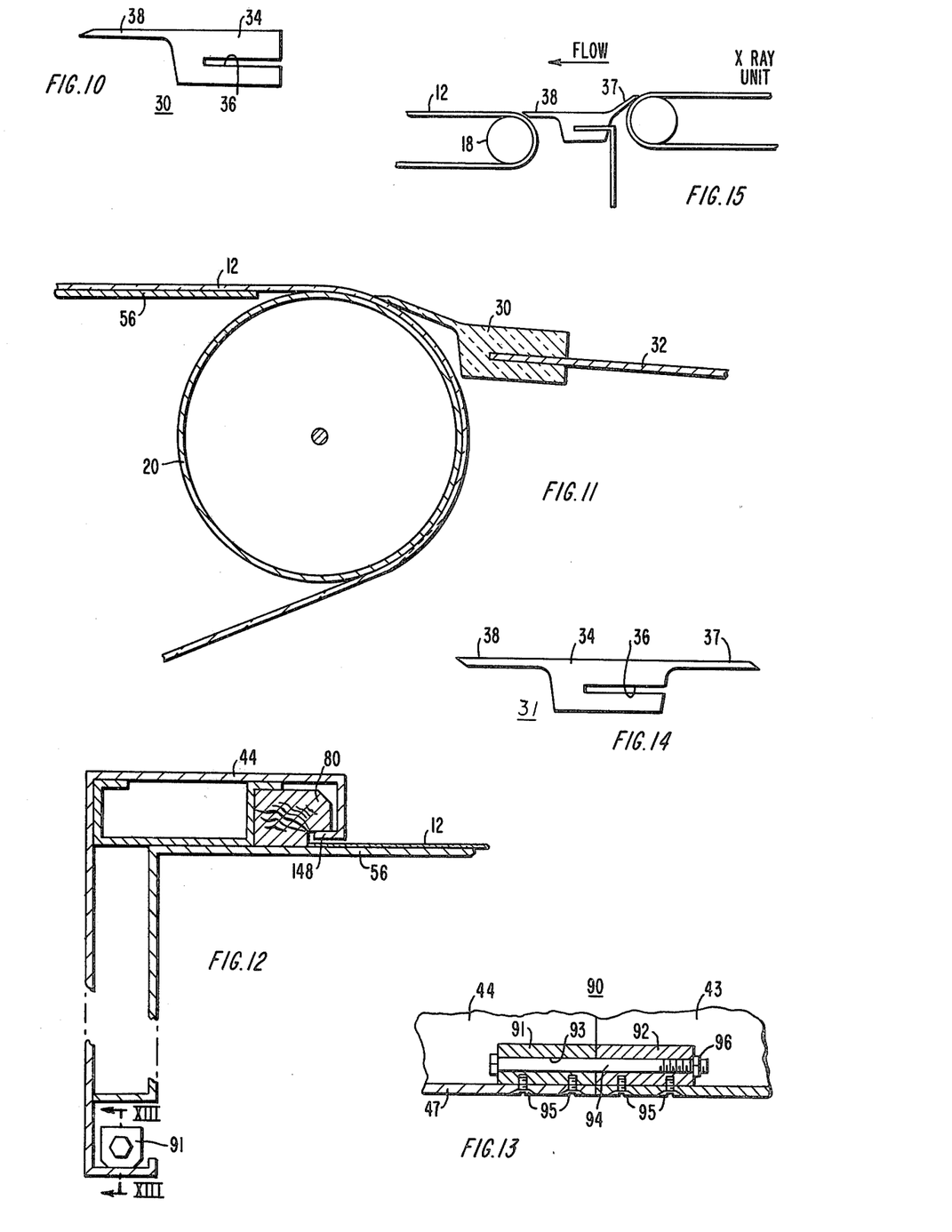
FIG. 10 is a side view of the transition piece which extends between the conveyor belt and the tray.
FIG. 11 is a section view through a portion of the conveyor showing a transition piece engaging the conveyor belt and the tray.
FIG. 12 is a section view through a portion of the conveyor shown in FIG. 1 illustrating the wooden guide and the side cover fastener.
FIG. 13 is a view of a portion of the side cover fastener shown in FIG. 12 along the line XIII—XIII.
FIG. 14 is a side view of a transition piece having two flexible portions.
FIG. 15 is a side view of the transition piece, shown in FIG. 14, disposed between two abutting conveyors.

Elongated wooden guides 80 and 82 are provided between pulleys 18 and 20 for guiding the edges of belt 12. The underside of conveyor belt 12 rides on plate 56 while the edges can ride up against wooden guides 80 or 82. During use, wooden guides 80 and 82, where in contact with belt 12 become highly polished and provide smooth longlasting guides for belt 12. Wooden guides 80 and 82 are formed from oak. Rollers or pulleys 18 and 20 are supported between elongated frame portions 52 and 54. These rotatable pulleys 18 and 20 can be adjusted slightly during installation to minimize any gaps when covers 40 through 44 are installed. Take-up pulley 24 is located beneath end pulleys 18 and 20 to provide take-up for belt 12, without moving pulleys 18 and 20. Drive pulley 22 is located lower than take-up pulley 24. Drive pulley 22 is formed with a knurled surface to drive belt 12 without slipping. During assembly, frame 50 is assembled as shown in FIG. 5. Continuous conveyor belt 12 is then installed. Covers 40, 42 and 44 can then be slid into position. End pulleys 18 and 20 can be adjusted to minimize any gaps present. End closure 46 on the input end can also be installed at this time. Side covers 42 and 44 and side cover portions 41 and 43 have the same cross-sectional configuration as can be seen in FIGS. 7, 9 and 12. This cross-section is complimentary with the construction of elongated frame member 52 and 54 to easily slide in place. Side portions 41 and 43 have tray 16 securely fastened thereto. Tray 16 fits into the open portion on the right hand of the framework shown in FIG. 5 when cover 40 is installed. Covers 40 and 44 are installed to be in butting relationship with portions 41, 43 respectively. As can best can be seen in FIG. 12 when the covers 40, 42 and 44 are installed, the edges of belt 12 which can engage wooden guide 80 and 82 are concealed. Cover portions 41 through 44 also maintain wooden guides 80 and 82 in position. Covers 40, 42 and 44 include a vertical side portion 45, an upper inwardly extending horizontal portion 46, and a lower inwardly extending portion 47. Lower inwardly extending portion 47 is somewhat shorter than portion 46. Portion 47 is concealed from normal view when the transfer conveyor 10 is assembled. Lower portion 47 extends from the bottom of vertical surface 45 and top horizontal surface 46 extends from the top of vertical surface 45. An upward projecting lip 49 extends from the inner edge of inward projecting bottom portion 47. A downward projecting surface 48 extends from the inner end of horizontal surface 46. An inward projecting lip 148 extends from the bottom of inward vertical portion 48. This lip 148 fits under a cutout formed in wooden guides 80 and 82 when installed. Where cover 44 contacts cover portion 43 and where cover 42 contacts cover portion 41 a fastening assembly 90 as shown in FIG. 13 is utilized for securely fastening the members together. Fastening assembly 90 consists of a pair of blocks 91 and 92, which have been cut from a common piece having a bore 93 extending therethrough. A bolt 94 is disposed within bore 93. Block 91 is secured by flat head machine screws 95 to one of the items to be joined, while block 92 is secured by machine screws 95 to the other item to be joined. Blocks 91 and 92 are formed from a single block which is cut in half after the items to be joined are positioned together and the holes for receiving screws 95 are drilled and tapped. A nut 96 is provided on bolt 94. During installation, block 91 is secured to cover 44 and block 92 is secured to cover portion 43. When covers 43 and 44 are in position, bolt 94 is positioned in bore 93 and nut 96 is tightened to securely pull the pieces together. As can best be seen in FIG. 12, the fastening assembly 90 is secured to the bottom inwardly projecting portion 47 of covers 40 through 44 where they are to be joined.

When covers 41, 42 and 43, 44 are positioned in butting relationship, the top horizontal surfaces 46 contact first and if there is any gap it is at the bottom between surfaces 47. When installed as bolt 94 and nut 96 are tightened, any small gap between the pieces being secured is eliminated. Only a tight seam remains between covers 41, 42 and cover portions 43, 44. As can be seen no visible fasteners are required.

Figure 8:
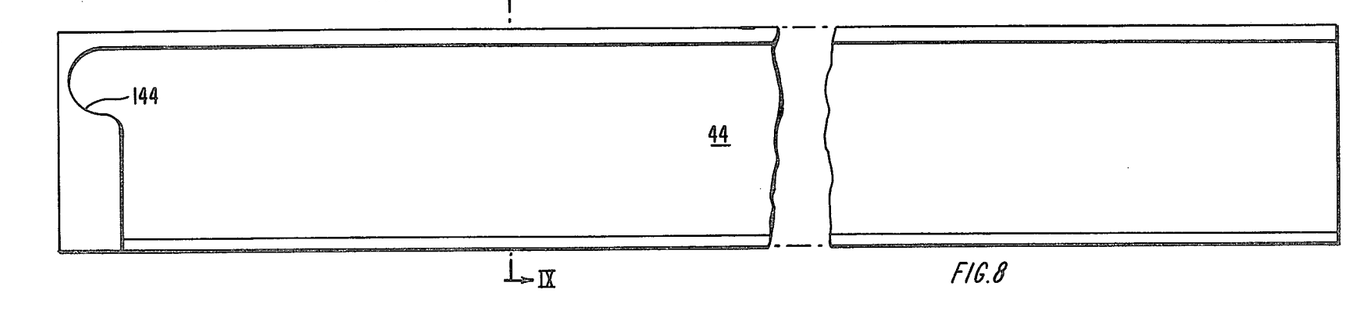
FIG. 8 is a side view of one of the side covers which fit on the input end of the transfer conveyor.

As can be seen in FIG. 8, side covers 42 and 44 include a circular portion 144 which fits around the belt 12 as it goes around intake end pulley 18. During installation intake end pulley 18 can be moved slightly so that there is very little gap between covers 42 and 44 and belt 12 as it travels around pulley 18.

A channel 146 is used to reinforce the free end of tray 16 where it extends towards pulley 20. This reinforcing angle 146 maintains this edge, which receives transition piece 30, relatively rigid. Transition piece 30 which is an important aspect of this invention permits a wide variety of articles to be transferred from conveyor belt 12 to accumulation tray 16. Transition piece 30 is formed from a high density polyethylene. This type of transition piece permits the transfer of items such as very thin garment covers from belt 12 to tray 16. Transferring these very thin items presents a problem in prior art luggage transfer apparatus. Transition piece 30 includes a base portion 34 having a slot 36 formed therein. A thinner relatively flexible portion 38 extends from base portion 34. As can best be seen in FIG. 11, flexible portion 38 contacts belt 12 as it moves around pulley 20 above the longitudinal axis of pulley 20. A level can be provided on the free end of flexible portion 38. Polyethylene transition piece 30 is compatible with belt 12 to efficiently transfer a wide variety of items to tray 16. The slot 36 in base portion 34 of transition piece 30 fits around the free edge of the slanted part 32 of tray 16. Passengers can retrieve their inspected luggage from moving surface 14 or tray 16.

Referring now to FIGS. 14 and 15 there is shown another embodiment of a transition piece. Transition piece 31 is similar to transition piece 30, but includes a second flexible portion 37. Transition piece 31 is provided for use between two abutting conveyor sections, as shown in FIG. 15. Thus transition piece 31 could for example be used between the output conveyor of an x-ray unit and the input to conveyor 10. If desired conveyor 10 can be made long enough so that an x-ray unit can be mounted thereon. The free ends of flexible portions 37 and 38 can be provided with a level to facilitate item transfer. Transition piece 31 is formed from high density polyethylene, or other suitable material, which is compatible with the conveyor belting used. Note that the flexible portion 37 contacts the belt of the conveyor moving towards it above the longitudinal axis of the return pulley. The flexible portions 37 and 38 both in fact contact their associated conveyor belts above the longitudinal axis of the end pulleys.

In a typical installation the transfer conveyor 10 has an overall length of 20 feet. The legs 60, 62 would be set in approximately three feet from each end. The depth of the tray at its deepest point would be approximately 8 inches. The depth of side covers 40 through 44 would be 12 inches. The overall conveyor 10 width would be 2 feet, 9 inches and the width of conveying surface 14 would be 2 feet, 1 inch. The speed of the belt would be 50 to 80 feet per minute. The belt height of surface 14 is preferably between 24 to 36 inches above the floor and this is determined by the height of legs 60 and 62. The height of surface 14 is selected to be slightly lower than the feeding coveyor from the inspection equipment. Only support legs 60 and 62 and the associated blocks 64 extend beneath the covers 40 through 44.

It can thus be seen that the disclosed transfer conveyor can expedite security screening of carry-on luggage, regardless of size and shape, by rapidly conveying it from the inspection equipment to the integral tray 16 where it can be picked up and taken onto the plane. For safety and appearance there are no exposed fasteners and this is particularly important on apparatus which will be used by a great many people. The conveyor belt, supports mechanical drive and integral trays are all disposed between the confines of the side covers 40 through 44. This permits easy access under conveyor 10. By securing the side covers 42 and 44 to the side portions 41 and 43 respectively as described, the covers provide for structural rigidity of the conveyor as well as providing a neat looking appearance. This construction permits a relatively long span between the two pair of legs. Stainless steel covers 40 through 44 are of relatively heavy 14 gauge stainless steel and provide a nice appearance as well as being functional.

What is claimed is:

1. A floor supported luggage transfer conveyor comprising:
    an elongated frame;
    a conveyor belt supported from said frame having a horizontal top surface for receiving luggage to be moved;
    a tray disposed at one end of said conveyor belt extending at an angle relative to the horizontal top surface of said conveyor belt;
    drive means supported from said frame for driving said conveyor belt to continuously move the horizontal top surface towards said tray;
    covers, slidable onto the ends of said frame and having a uniform depth, disposed along and engaging the sides of said elongated frame and said tray;
    fastening means for joining said covers together;
    said covers when joined together provide some structural support for said frame;
    a plurality of legs which are longer than the depth of said covers supporting said conveyor belt, said drive means, said tray and said covers spaced apart from the floor; and,
    said drive means supported within the volume defined by said covers.

2. A luggage transfer conveyor as claimed in claim 1 wherein:
    said tray has a free edge spaced apart by a small separation from said conveyor belt; and including,
    a transition piece having a slot formed therein, for engaging the free edge of said tray, and a thinner cross-section portion, extending to a position in contact with said conveyor belt, being relatively flexible and bent at an angle towards a vertical upright position relative to said tray.

3. A luggage transfer conveyor as claimed in claim 2 wherein:
    said covers are formed from stainless steel;
    said conveyor belt comprises nylon; and,
    said transition piece comprises polyethylene.

4. A luggage transfer conveyor as claimed in claim 1 wherein:
    said legs are formed from square tubular metallic members which are rigidly secured to said frame;
    a frame supporting said covers, said drive means, said tray, and said conveyor belt; and,
    wooden blocks fit onto the bottom ends of said legs between the floor and the bottom of the metallic tubular members forming said legs.

5. A luggage transfer conveyor as claimed in claim 1 comprising:

wooden guides disposed along the edges of said conveyor belt in the vicinity of the horizontal top surface to guide said conveyor belt; and, said cover concealing said wooden guides.

6. A luggage transfer conveyor as claimed in claim 5 wherein:

said wooden guides are formed from oak.

7. A luggage transfer conveyor as claimed in claim 1 wherein:

said horizontal top surface is of a fixed length which is defined by said tray and said covers.

8. A luggage transfer conveyor as claimed in claim 1 wherein:

said covers are formed from more than one piece each of which has the same general cross-sectional area which is of a generally C shape;

a joint formed where the pieces of said cover butt together and being fastened at the bottom of the C shape section; and said joint comprises, a pair of mating connecting blocks utilized at each joint, one of which is connected to each of the pieces to be joined, including a bore formed therethrough;

a fastener disposed in the bore formed in each pair of mating connecting blocks to securely pull the cover sections together to form a snug joint.

9. A conveyor supported from a floor comprising:

an elongated frame;

a plurality of legs securely connected to said frame for supporting said elongated frame above the floor;

a continuously driven conveyor belt supported from said frame providing a flat horizontal top moving surface;

an accumulation tray for receiving items moved by said conveyor belt extending lower than and at an angle with respect to the horizontal top moving surface of said conveyor belt having a free edge, disposed in proximity to said conveyor belt, an end cover portion and two side cover portions which extend past the free edge to surround a portion of the edges of said conveyor belt and slidably engage said frame;

a pair of side covers, each having the same cross-section as the two side cover portions of said accumulation tray, slidably engaging said elongated frame in a butting relationship with the two side cover portions of said accumulation tray surrounding the portion of the edges of said conveyor belt not surrounded by the two side cover portions of said accumulation tray; and, securing means for securing the ends of said pair of side covers in butting engagement with the ends of the two side cover portions of said accumulation tray.

10. A conveyor supported from a floor comprising:

an elongated frame;

a plurality of legs securely connected to said frame for supporting said elongated frame above the floor;

a continuously driven conveyor belt supported from said frame providing a flat horizontal top moving surface;

an accumulation tray for receiving items moved by said conveyor belt extending lower than and at an angle with respect to the horizontal top moving surface of said conveyor belt having a free edge, disposed in proximity to said conveyor belt, an end cover portion and two side cover portions which extend past the free edge to surround a portion of the edges of said conveyor belt and slidably engage said frame;

a pair of side covers, each having the same cross-section as the two side cover portions of said accumulation tray, slidably engaging said elongated frame in a butting relationship with the two side cover portions of said accumulation tray surrounding the portion of the edges of said conveyor belt not surrounded by the two side cover portions of said accumulation tray;

securing means for securing the ends of said pair of side covers in butting engagement with the ends of the two side cover portions of said accumulation tray;

the cross-section of said pair of side covers defines an outer vertical portion, an upper horizontal portion extending inward from the top edge of the outer vertical portion, a lower horizontal portion extending inward from the lower edge of the outer vertical portion and being shorter than the upper horizontal portion, an inner vertical portion extending from the free edge of said upper horizontal portion downward, an upper lip extending from the inner vertical portion towards said outer vertical portion, and a lower lip extending upward from said lower horizontal portion; and said securing means disposed on and engaging said lower horizontal portion.

11. A conveyor as claimed in claim 10 wherein said securing means comprises:

a pair of mating blocks formed with a longitudinal bore extending therethrough;

one of said pair of blocks secured to the end of one of the cover sections to be connected; and, fastening means disposed in the bore through said pair of mating blocks to securely pull the cover section to be connected into snug butting engagement.

12. A conveyor comprising:

an elongated frame;

a plurality of side cover portions slidable onto each end of said elongated frame to abut intermediate the ends of said elongated frame;

a plurality of fasteners to connect the abutting portions of said side covers together so that the side covers engage and provide structural support for said frame;

a continuous movable conveyor belt, disposed on said frame, having a top surface for conveying baggage;

a tray disposed at the end of said continuous movable conveyor belt, towards which the top surface moves, at an angle with respect to said top horizontal surface and including an edge positioned in proximity to said belt as it moves around;

a pulley disposed in proximity to the edge of said tray around which said continuous movable conveyor belt moves and changes direction; and, a transition piece, disposed in engagement with said conveyor belt and the edge of said tray, formed with a base portion which is positioned on the edge of said tray and a flexible portion which extends from the base portion and engages said conveyor belt as it moves on said pulley above the longitudinal axis of said pulley.

13. A conveyor as claimed in claim 12 comprising:

a plurality of legs extending from said frame and supporting said frame spaced apart from the floor; and, said plurality of side covers extending along the sides of the continuous movable conveyor and said tray to define a conveyor having one end open.

14. A conveyor as claimed in claim 13 wherein: said plurality of side covers are formed with a C-shape complementary with the shape of said frame to slidably engage said frame.

15. A conveyor as claimed in claim 12 wherein:
said conveyor belt comprises nylon;
said transition piece comprises polyethylene; and,
said tray comprises stainless steel.

16. A floor supported extension conveyor comprising:
an elongated frame;
a plurality of elongated legs supporting said frame spaced apart from the floor;
side covers, having a uniform height, extending around three sides of said frame defining a U shaped top surface with said frame disposed within the volume defined by the said plurality of said covers;
fastening means for securely fastening said side covers together;
said side covers slidable onto said elongated frame to engage said elongated frame and provide structural support for said elongated frame when joined together;
an endless conveyor belt disposed in the volume defined by said side cover extending from the open portion of said U shaped top surface towards the bight portion providing an exposed flat top surface for conveying items;
drive means for driving said endless conveyor belt disposed in the volume defined by said side covers; and,
a tray for accumulating the items carried by said endless conveyor belt disposed between the bight portion and said U shaped top surface and said endless conveyor belt within the volume defined by said side covers and beneath the exposed flat top surface of said endless conveyor.

17. A floor supported extension conveyor as claimed in claim 16 wherein:
said tray includes a downward sloping portion extending away from the exposed flat top surface of said endless conveyor belt; and comprising,
a return pulley disposed in proximity to said tray around which said endless conveyor belt travels;
a polyethylene transition piece supported on the downward sloping portion of said tray and engaging said endless conveyor belt.

18. A floor supported extension conveyor as claimed in claim 17 wherein said polyethylene transition piece comprises:
a base portion having a slot formed therein which fits onto said tray; and,
a flexible portion extending from said base portion engaging said endless conveyor as it travels around said return pulley to extend above said base portion.

19. A floor supported extension conveyor as claimed in claim 16 wherein:
the plurality of elongated legs support the frame and side covers above the floor at a height greater than the height of the side covers.

20. A floor supported extension conveyor as claimed in claim 16 wherein said side covers provide an inward extending horizontal top surface extends inward over the edges of said endless conveyor belt and an inward extending horizontal bottom surface which extends inward beneath a portion of said frame;
said side covers being secured together by fasteners which connect only two said inward projecting bottom portions providing outer exposed surfaces which do not have any exposed fasteners.

21. A floor supported extension conveyor as claimed in claim 16 comprising:
two end pulleys around which said endless conveyor belt extends;
a drive pulley located beneath said pair of end pulleys;
a take-up pulley located beneath said pair of end pulleys for taking up slack in the endless conveyor belt; and,
said two end pulley, said drive pulley, and said take-up pulley all disposed within the volume defined by said plurality of side covers.

22. A floor supported extension conveyor as claimed in claim 20 wherein:
said plurality of elongated legs are formed from a square tubular member; and,
wooden block members are connected to said elongated leg members between the floor and said leg members.

23. A floor supported extension conveyor comprising:
a frame;
a plurality of elongated legs supporting said frame spaced apart from the floor;
side covers extending around three sides of said frame defining a U shaped top surface with said frame disposed within the volume defined by the said plurality of side covers;
an endless conveyor belt disposed in the volume defined by said side cover extending from the open portion of said U shaped top surface towards the bight portion providing an exposed flat top surface for conveying items;
drive means for driving said endless conveyor belt disposed in the volume defined by said side covers;
a tray for accumulating the items carried by said endless conveyor belt disposed between the bight portion of said U shaped top surface and said endless conveyor belt within the volume defined by said side covers and beneath the exposed flat top surface of said endless conveyor;
said side covers provide an inward extending top surface extending over the edges of said endless conveyor belt and an inward extending horizontal bottom surface which extends inward beneath a portion of said frame;
said side covers being secured together by fasteners which connect only two said inward projecting bottom portions providing outer exposed surfaces which do not have any exposed fasteners;
said plurality of elongated legs are formed from a square tubular member;
wooden block members are connected to said elongated leg members between the floor and said leg members;
a pair of elongated wooden guides disposed along the edges of the flat top surface of said endless conveyor belt for guiding said endless conveyor belt.

24. A luggage conveyor comprising:
a frame formed with a pair of elongated structural members;
a pair of spaced apart elongated end pulleys supported on said frame between said pair of elongated structural members;
an elongated drive pulley supported from said frame parallel to said spaced apart pair of pulleys disposed between and beneath said spaced apart pair of elongated pulleys;
a take-up pulley supported from said frame parallel to said drive pulley disposed between and beneath said spaced apart pair of elongated pulleys;
a continuous conveyor belt disposed to ride on said pair of spaced apart elongated pulleys, said drive pulley and said take-up pulley;
a drive motor connected to said drive pulley for rotating said drive pulley and moving said continuous conveyor belt;
a tray formed at one end of said frame and extending between said pair of elongated structural members in close proximity to one of said spaced apart elongated pulleys;
a plurality of side covers formed along the sides of said frame and around said tray having an inward projecting portion extending towards the longitudinal center of said frame over the edges of said continuous conveyor belt;
said plurality of side covers slidable onto the elongated structural members of said frame;
fastening means to join said plurality of side covers together; and,
said plurality of side covers when joined together provide some structural support for said frame.

25. A luggage conveyor as claimed in claim 24 wherein:
said tray includes an edge extending parallel to and in proximity to the associated elongated end pulley; and comprising,
a transition piece engaging the edge of said tray and said conveyor belt as it travels around said end pulley.

26. A luggage conveyor as claimed in claim 24 wherein:
said transition piece is formed from polyethylene and comprises a slotted base which fits on the edge of said tray and a flexible portion extending from said slotted base portion and engaging said continuous conveyor belt at a position above the longitudinal axis of the associated end pulley.

27. A luggage conveyor as claimed in claim 24 wherein:
said side covers are formed from a plurality of parts each having an exposed top and side surface and an unexposed bottom surface extending inward; and,
fastener means connected to said bottom unexposed surfaces of each said plurality of parts for joining said plurality of parts together to form a unitary side cover.

* * * * *